(12) United States Patent
Montanari et al.

(10) Patent No.: US 6,239,216 B1
(45) Date of Patent: *May 29, 2001

(54) THERMOPLASTICS WITH IMPROVED FLEXIBILITY AND TRANSPARENCY

(75) Inventors: Thibaut Montanari; Chrystelle Guibouin, both of Bernay; Marius Hert; Patrice Perret, both of Serquigny; Jacques Thomasset, Bernay, all of (FR)

(73) Assignee: Atofina (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/011,315

(22) PCT Filed: Jun. 5, 1997

(86) PCT No.: PCT/FR97/01002

§ 371 Date: Aug. 27, 1998

§ 102(e) Date: Aug. 27, 1998

(87) PCT Pub. No.: WO97/46620

PCT Pub. Date: Dec. 11, 1997

(30) Foreign Application Priority Data

Jun. 5, 1996 (FR) .................................................. 96 06921

(51) Int. Cl.$^7$ .................................................. C08G 63/48
(52) U.S. Cl. ...................... 525/66; 523/201; 428/402.24; 428/403; 525/179; 525/183; 525/902
(58) Field of Search .............................. 525/66, 179, 183, 525/902; 428/402.24, 403; 523/201

(56) References Cited

U.S. PATENT DOCUMENTS

| | | |
|---|---|---|
| 3,694,412 | 9/1972 | Nozaki . |
| 4,115,475 | 9/1978 | Foy et al. . |
| 4,195,015 | 3/1980 | Deleens et al. . |
| 4,230,838 | 10/1980 | Foy et al. . |
| 4,331,786 | 5/1982 | Foy et al. . |
| 4,332,920 | 6/1982 | Foy et al. . |
| 4,839,441 | 6/1989 | Cuzin et al. . |
| 4,843,144 | 6/1989 | Van Broekhoven et al. . |
| 4,864,014 | 9/1989 | Cuzin et al. . |
| 4,880,903 | 11/1989 | Van Broekhoven et al. . |
| 5,070,145 | 12/1991 | Guerdoux . |
| 5,332,782 | * 7/1994 | Liu et al. ............................... 525/66 |
| 5,457,156 | * 10/1995 | Liu et al. ............................... 525/74 |

FOREIGN PATENT DOCUMENTS

| | | |
|---|---|---|
| 234819 | 9/1987 | (EP) . |
| 284379 | 9/1988 | (EP) . |
| 342066 | 11/1989 | (EP) . |
| 402883 | 12/1990 | (EP) . |
| 405227 | 1/1991 | (EP) . |
| 423628 | 4/1991 | (EP) . |
| 436080 | 7/1991 | (EP) . |
| 683210 | 11/1995 | (EP) . |
| 2603292 | 3/1988 | (FR) . |
| 2719849 | 11/1995 | (FR) . |
| 2287028 | 9/1995 | (GB) . |

\* cited by examiner

*Primary Examiner*—John M. Cooney, Jr.
(74) *Attorney, Agent, or Firm*—Pennie & Edmonds LLP

(57) ABSTRACT

The invention relates to a thermoplastic composition comprising at least one polymer (M) forming a matrix in which are dispersed nodules of (K), nodules of (K) entirely or partly encapsulated in at least one polymer (S) and nodules of (S) and such that the nodules of (K) entirely or partly encapsulated in (S) are smaller than the nodules of (S).

19 Claims, No Drawings

THERMOPLASTICS WITH IMPROVED FLEXIBILITY AND TRANSPARENCY

The invention relates to multiphase thermoplastic resin compositions and more particularly to compositions in the form of a matrix in which nodules are dispersed.

Many thermoplastics have to be modified by incorporating rubbers or other polymers, for example in order to modify the flexural modulus thereof or to improve the impact strength.

The Applicant has discovered that if a third polymer (K) meeting certain criteria were to be added to a matrix (M) containing nodules (S), then a composition was obtained which had a new distribution of nodule sizes and for most of the nodules a reduction in size.

This has many advantages, for example when the polymer of the matrix is transparent or even translucent, the reduction in the size of the nodules increases the transparency or makes the polymer more translucent for a constant level of dispersed phase. The mechanical properties, such as tensile strength or impact strength, are also improved.

U.S. Pat. No. 5,070,145 describes compositions consisting of 80 parts of nylon-6 (PA-6) or nylon-6,6 (PA-6,6) in which 20 parts of a mixture (i) of a copolymer of ethylene and of an ethyl or butyl acrylate and (ii) of a copolymer of ethylene, ethyl acrylate and maleic anhydride have been dispersed. These compositions have good impact strength.

EP 284,379 describes multiphase compositions consisting of a polyamide and of an ethylene copolymer in the form of a polyamide matrix in which nodules (1) of an ethylene-ethyl acrylate-maleic anhydride copolymer are dispersed, and dispersed in these nodules (1) are nodules of polyamides. These nodules (1) are firstly prepared by dispersing a polyamide in the ethylene copolymer, and then these nodules are crosslinked and then dispersed in a polyamide. These compositions are also presented as having a good impact strength.

Patent FR 2,719,849 describes thermoplastic compositions consisting of a matrix of a thermoplastic polymer in which nodules of a second thermoplastic polymer, partially or totally encapsulated by an ethylene copolymer, are dispersed. These compositions are prepared by firstly encapsulating the second polymer and then the other polymer forming the matrix is added under conditions such that the capsules are not destroyed. This preparation is carried out in two steps which are completely separate or with one step following the other in the same extruder. These compositions have both good flexibility and good impact strength. The examples show PA-6, PA-12 or PBT (polybutylene terephthalate) matrices in which are dispersed nodules of PA-6,6 encapsulated by an ethylene-ethyl acrylate-glycidyl methacrylate copolymer. A comparative example shows that in a PA-6 matrix the PA-6,6 nodules encapsulated by the ethylene copolymer are coarser than the nodules formed only from the ethylene copolymer.

The present invention is therefore a thermoplastic composition comprising at least one polymer (M) forming a matrix in which are dispersed nodules of (K), nodules of (K) entirely or partly encapsulated in at least one polymer (S) and nodules of (S) and such that the nodules of (K) entirely or partly encapsulated in (S) are smaller than the nodules of (S).

The polymer (M) may be a mixture of several miscible polymers forming a homogeneous phase. The same applies to the polymer (K) and the polymer (S). The compositions of the invention may also comprise several types of encapsulated nodules, for example nodules of (K1) which are encapsulated in (S) and nodules of (K2) which are encapsulated in (S) or else nodules of (K1) which are encapsulated in (S1) and nodules of (K2) which are encapsulated in (S2).

The compositions of the invention are particularly useful for transparent polymers (M) which can be used, for example, to make packaging, pipes of which the contents must be visible, tanks in which the level must be visible, or protective films.

In order to modify the impact properties or the flexural modulus of a polymer (M), it is necessary to add a plasticizer and/or a polymer (S) to it. The drawback of a plasticizer is that, above a certain amount, it exudes and therefore the properties are not preserved. If the amount of (S) is increased too much, there may be compatibility problems and another property may also be affected. For example, if the amount of (S) in (M) is increased, a reduction in the flexural modulus is indeed obtained, but there is a reduction in the tensile strength, which may also be expressed by a decrease in the burst strength of an extruded tube.

For a transparent polymer (M), the increase in the amount of (S), for example in order to decrease the flexural modulus, may also, depending on the nature of (S), a decrease in the transparency.

The Applicant has therefore discovered that by adding a polymer (K) to a mixture of (S) in (M), nodules of (K), nodules of (K) entirely or partly encapsulated in (S) and nodules of (S), called the dispersed phase in (M), were obtained.

The majority (by weight) of this dispersed phase consists of nodules of (K) entirely or partly encapsulated in (S). This is the more so if matrices (M) containing an essentially equal amount of dispersed phase, that is to say that part of (S) dispersed in (M) has been replaced by (K), are compared.

Although nodules of (S) remain in the (M)+(S)+(K) mixtures, the number of them is not sufficient to impair the transparency, most of the nodules being nodules of (K) entirely or partly encapsulated in (S) and therefore having a smaller size than the nodules of (S) in (M), the transparency of (M)+(S)+(K) is superior to the transparency of (M)+(S) at the very least for a constant proportion of (M).

The present invention also relates to transparent thermoplastic compositions comprising at least one polymer (M) forming a matrix in which are dispersed at least one polymer (S) and at least one polymer (K) and such that their transparency is superior to that of compositions comprising only (M) and (S), the proportion of (M) being essentially the same.

Since effectively what is involved is a comparison of polymers (M) essentially containing the same amount of dispersed phase, matrices (M) containing either (S) or (S)+(K) are therefore compared, the amounts of (S) and (S)+(K) being essentially the same.

The transparency may be measured by the transmission of radiation of 560 nm through a film of 2 mm thickness and by the opacity.

Thus, for example, it has been discovered that the nodules of an ethylene/alkyl acrylate/maleic anhydride copolymer in a nylon-11 (PA-11) matrix have a size of 0.2 $\mu$m while, in the same matrix, the nodules of nylon-12 (PA-12) which are encapsulated in the same ethylene/alkyl acrylate/maleic anhydride copolymer have a size of 0.07 $\mu$m (this is the size Dv (volume diameter) of the nodule together with the capsule, i.e. approximately the external diameter of the capsule).

The present invention also relates to a thermoplastic composition comprising at least one polymer (M) forming a matrix in which are dispersed at least one polymer (S) and at least one polymer (K) and such that its flexural modulus is less than the expected flexural modulus, this expected modulus being calculated from the modulus of a composition comprising only a matrix (M) and the same amount of dispersed (S), and the modulus being calculated by adding the moduli of (M) and (K) in proportion to their proportions by weight.

For the PA-12+15% (S) example (Ex. 25), the modulus is 880. The expected modulus of PA-12+15% (S)+15% PA-11 is 860 (PA-11 has a modulus of 1000 compared with 1100 for PA-12), while the measured modulus is 740.

The compositions of the invention have many advantages:

- they are more stable, the morphology of the majority of the dispersed phase being finer, that is to say that (M) and (S) have been made more compatible;
- they are essentially as flexible as the compositions of (M) comprising nodules containing only (S) since the polymer (K) may be screened with a sufficient thickness of capsule (S). We will return to this point later in the text;
- the finer morphologies also increase the strength of reweld lines;
- they are very easy to manufacture, simply by mixing (M), (K) and (S), for example in a short or barely plasticating extruder (standard or bottom-of-the-range extruder) or even directly in an injection moulding machine, while in the prior art it is necessary to make them in 2 steps;
- they have good flexibility without losing mechanical properties; thus, compositions consisting of (M), (S) and (K) having the same flexural modulus as compositions consisting of (M) and (S) have a superior tensile strength. This superior strength may also be manifested by the higher burst pressure of a pipe manufactured by extrusion of the compositions of the invention;
- they have good impact strength;
- (M) need only be, relatively, the major phase in order for it to be the matrix and to avoid phase inversion. For example, it would therefore be possible to have 35 parts of (M), 32.5 parts of (S) and 32.5 parts of (K); and
- in addition to these compositions being particularly stable, they may be prepared and sold in the form of granules and used in conventional machines, and may also be recycled, for example if there is manufacturing scrap due to cutting operations.

The invention relates to the reduction in the size of the majority of nodules of (S), whatever their initial size, when (K) is added.

The polymers (M) and (K) may be chosen from thermoplastics. (M) and (S) are chosen to be compatible. Since (S) is dispersed in the matrix of (M) in the form of nodules, (M) and (S) are deemed to be all the more compatible the smaller the nodules of (S) are.

However, it is estimated that if the nodules of (S) are greater than 10 $\mu$m they are only slightly compatible, if the nodules are between 0.5 and 10 $\mu$m and preferably between 0.5 and 2 $\mu$m they are compatible, and below 0.5 $\mu$m they are very compatible. (K) must be compatible with (S); (K) is therefore selected by preparing dispersions of (K) in (S) and by measuring the size of the nodules. This is the general selection criterion and, from the various polymers (K) meeting this criterion another selection is made depending on the desired properties for the compositions of the invention. This other selection may depend on the modulus, chemical properties, viscosity, melting temperature and reactivity.

As above, if the nodules of (K) in (S) are greater than 10 $\mu$m they are only slightly compatible, if the nodules are between 0.5 and 10 $\mu$m and preferably between 0.5 and 2 $\mu$m they are compatible, and below 0.5 $\mu$m they are very compatible.

It is said that the compatibility of (K) with (S) is the same as the compatibility of (S) with (M) when the nodules of (S) in (M) have the same size as the nodules of (K) in (S). It is not necessary for the compatibility of (K) with (S) to be superior to the compatibility of (S) with (M). Advantageously, the size of the nodules of (K) in (S) must not be greater than twice the size of the nodules of (S) in (M) and is preferably approximately the same or smaller. This value of twice, and likewise the expression "approximately the same", is to be adapted to the size of the nodules, the measurement accuracy being in fact higher for the nodules greater than 1 or 5 $\mu$m than for the smaller nodules.

It would not be outside the scope of the invention to carry out the test of compatibility of (K) with (S) by measuring nodules of (S) in (K) and then by proceeding as described above.

(K) must also not be too compatible with (M) in order for them to demix and for the majority of (K) to go into the capsule (S). If, then, (K) is strictly identical to (M), there will be nodules of (S) in (M). But (K) and (M) may, for example, be two different polyamides or two polyamides derived from the same monomers and having different physical properties. The measurements of the compatibility of (M) with (S) and of (K) with (S) are therefore carried out as indicated previously and it is checked whether the majority of (K) is encapsulated in (S) when (M), (K) and (S) are mixed together.

Advantageously, (M) and (K) are selected from the same family of polymers, for example polyamides, saturated polyesters and other polymers, as will be described later. That is to say that (M) and (K) are two polyamides, two polyesters, etc.

It is also necessary to check the reduction in size of the nodules.

The mixing of (M), (K) and (S) is advantageously carried out by introducing (M), (K) and (S) simultaneously in a device for mixing (K) into the mixture of (M) and (S), or for mixing (M) into the mixture of (K) and (S) or for (S) into the mixture of (K) and (M). However, it would not be outside the scope of the invention to use various steps or different orders of addition, provided that the desired morphology is obtained.

In addition to the compatibility or incompatibility conditions, the melt flow index (MFI) of (M) is advantageously greater than that of (K).

By way of polymers (M), mention may be made of polyolefins, polyamides, fluoropolymers, saturated polyesters, polycarbonate, styrene resins, PMMA, thermoplastic polyurethanes (TPU), copolymers having polyamide blocks, copolymers having polyester blocks and polyether blocks, PVC, ethylene-vinyl alcohol copolymers (EVOH) and polyketones.

Polyamide (A) is understood to mean condensation products:

- of one or more amino acids, such as aminocaproic, 7-aminoheptanoic, 11-aminoundecanoic and 12-aminododecanoic acids, and of one or more lactams, such as caprolactam, oenantholactam and lauryllactam;
- of one or more salts or mixtures of diamines, such as hexamethylenediamine, dodecamethylenediamine, m-xylylenediamine, bis(p-aminocyclohexyl)methane and trimethylhexamethylenediamine with diacids such as isophthalic, terephthalic, adipic, azelaic, suberic, sebacic and dodecanedicarboxylic acids;

or of mixtures of some of these monomers, which results in copolyamides, for example PA-6/12 by the condensation of caprolactam and of lauryllactam.

Polymers having polyamide blocks and polyether blocks result from the copolycondensation of polyamide blocks having reactive ends with polyether blocks having reactive ends, such as, inter alia:

1) Polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha-omega polyoxyalkylene blocks called polyetherdiols;
3) polyamide blocks having dicarboxylic chain ends with polyetherdiols, the products obtained being, in this particular case, polyetheresteramides.

Polyamide blocks having dicarboxylic chain ends derive, for example, from the condensation of aminocarboxylic alpha-omega acids from lactams or of carboxylic diacids and diamines in the presence of a chain-terminating carboxylic diacid. Advantageously, the polyamide blocks are of nylon-12.

The number-average molar mass of the polyamide blocks is between 300 and 15,000 and preferably between 600 and 5000. The mass of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react polyetherdiol, a lactam (or an alpha-omega amino acid) and a chain-terminating diacid in the presence of a small amount of water. A polymer is obtained having essentially polyether blocks and polyamide blocks of very variable length, but also the various reactants, having reacted in a random fashion, are distributed randomly along the polymer chain.

These polyamide-block polyether-block polymers, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in m-cresol at 25° C.

Whether the polyether blocks derive from polyethylene glycol, from polyoxypropylene glycol or from polyoxytetramethylene glycol, they are either used as such and copolycondensed with polyamide blocks having carboxylic ends or they are aminated in order to be transformed into diamine polyethers and condensed with polyamide blocks having carboxylic ends. They may also be mixed with polyamide precursors and a chain terminator in order to make polyamide-block polyether-block polymers having randomly distributed units.

Polymers having polyamide and polyether blocks are described in U.S. Pat. Nos. 4,331,786, 4,115,475, 4,195,015, 4,839,441, 4,864,014, 4,230,838 and 4,332,920.

The polyether may, for example, be a polyethylene glycol (PEG), a polypropylene glycol (PPG) or a polytetramethylene glycol (PTMG). The latter is also called polytetrahydrofuran (PTHF).

Whether the polyether blocks are introduced into the chain of the polyamide-block polyether-block polymer in the form of diols or of diamines, they are called, for simplification, PEG blocks or PPG blocks or PTMG blocks.

It would not be outside the scope of the invention if the polyether blocks contained different units, such as units derived from ethylene glycol, from propylene glycol or from tetramethylene glycol.

Advantageously, the polyamide-block polyether-block polymer is such that the polyamide is the major constituent by weight, that is to say that the amount of polyamide which is in the form of blocks and that which is possibly distributed randomly in the chain represents 50% by weight or more of the polyamide-block polyether-block polymer. Advantageously, the amount of polyamide and the amount of polyether are in the (polyamide/polyether) ratio of from 50/50 to 80/20.

Preferably, the polyamide blocks and the polyether blocks of the same polymer (B) have respectively masses Mn of 1000/1000, 1300/650, 2000/1000, 2600/650 and 4000/1000.

The term polyolefin is understood to mean a polymer containing olefin units such as, for example, ethylene, propylene or 1-butene units or any other alpha-olefin. By way of example, mention may be made of:

polyethylenes such as LDPE, HDPE, LLDPE or VLDPE, polypropylene, ethylene/propylene copolymers or metallocene PEs;

copolymers of ethylene with at least one product selected from the salts or esters of unsaturated carboxylic acids, or the vinyl esters of saturated carboxylic acids.

Advantageously, the polyolefin is selected from LLDPE, VLDPE, polypropylene, ethylene/vinyl acetate copolymers or ethylene/alkyl (meth)acrylate copolymers. Advantageously, the density may be between 0.86 and 0.965 and the melt flow index (MFI) may be between 0.3 and 40.

By way of examples of fluorinated polymers, mention may be made of polyvinylidene fluoride (PVDF), copolymers containing vinylidene fluoride (VF2), ethylene-tetrafluoroethylene copolymers, poly(trifluoroethylene), trifluoroethylene copolymers, homopolymers and copolymers of hexafluoropropene and homopolymers and copolymers of chlorotrifluoroethylene. Advantageously, PVDF is used.

By EVOH is meant ethylene-vinyl alcohol copolymers. They derive from the hydrolysis of ethylene/vinyl acetate copolymers, this hydrolysis possibly being incomplete and vinyl acetate units possibly remaining.

By way of example of polyesters, mention may be made of PET (polyethylene terephthalate), PBT (polybutylene terephthalate) or PEN (polyethylene naphthenate).

Polyester-block polyether-block copolymers are copolymers having polyether units derived from polyetherdiols, such as polyethylene glycol (PEG), polypropylene glycol (PPG) or polytetramethylene glycol (PTMG), carboxylic diacid units such as terephthalic acid and glycol units (ethanediol) or 1,4-butanediol. The linking of the polyethers and of the diacids forms the flexible segments while the linking of the glycol or of the butanediol with the diacids forms the rigid segments of the copolyetherester.

Such copolyetheresters are described in Patents EP 402,883 and EP 405,227, the contents of which are incorporated in the present application.

By way of thermoplastic polyurethanes, mention may be made of polyether urethanes, for example those containing diisocyanate units, units derived from polyetherdiols and units derived from ethanediol or from 1,4-butanediol.

Mention may also be made of polyester urethanes, for example those containing diisocyanate units, units derived from amorphous polyesterdiols and units derived from ethanediol or from 1,4-butanediol.

Polyketones are polymers containing substantially one mole of carbon monoxide for each mole of unsaturated monomer. This monomer may be selected from alpha-olefins having from 2 to 12 carbon atoms or their substitution derivatives. It may also be selected from styrene or its derivatives obtained by substitution with alkyls, such as methylstyrenes, ethylstyrene and isopropylstyrene.

Preferably, the polyketones are ethylenecarbon monoxide copolymers or ethylene-polypropylenecarbon monoxide copolymers.

When the polyketones are copolymers of ethylene, a second monomer and carbon monoxide, there are at least two ethylene units for one unit of the second monomer, and preferably from 10 to 100.

The polyketones may be represented by the formula:

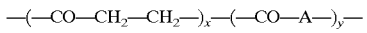

in which A denotes an unsaturated monomer having at least three carbon atoms, the x/y ratio being at least 2.

The units —(—CO—CH$_2$—CH$_2$—) and —(—CO—A—)— are randomly distributed in the polyketone chain.

The number-average molar masses may be between 1000 and 200,000, advantageously between 20,000 and 90,000, measured by gel permeation chromatography). The melting temperatures may be between 175 and 300° C., usually between 200 and 270° C.

Syntheses of these polyketones are described in U.S. Pat. No. 4,843,144, US 4,880,903 and US 3,694,412, the contents of which are incorporated in the present application.

By way of examples of polymers (K), mention may be made of the same examples as the polymers (M).

The polymer (S) is any product which can encapsulate (K) in a matrix (M) and such that the nodules thus encapsulated are smaller than the nodules of (S) in (M). In the sense of the present invention, (S) is any product which is in the form of nodules in a matrix (M) and which is also in the form of nodules in a matrix (K) or which may be a matrix containing nodules (K). Advantageously, (S) is a thermoplastic having affinities with (M) and with (K) and/or able to react with (M) and (K) or having affinities with (M) and able to react with (K), or vice versa.

For example, (S) may be a polyolefin chain having polyamide grafted species or polyamide oligomers; thus (S) has affinities with polyolefins and polyamides.

(S) may also be an ethylene copolymer having maleic anhydride units; thus (S) has affinities with polyethylenes and may react with polyamides.

By way of example of (S), mention may be made of functionalized polyolefins, grafted aliphatic polyesters, polyether-block polyamide-block polymers, optionally grafted, and copolymers of ethylene and an alkyl (meth) acrylate and/or a vinyl ester of a saturated carboxylic acid.

(S) may also be a block copolymer having at least one block compatible with (M) and at least one block compatible with (K).

The functionalized polyolefin is a polymer containing alpha-olefin units and epoxy units or carboxylic acid units or carboxylic-acid anhydride units.

By way of example, mention may be made of the polyolefins mentioned with regard to the polymers (M), or SBS, SIS, SEBS or EPDM block polymers grafted by unsaturated epoxies, such as glycidyl (meth)acrylate or by carboxylic acids, such as (meth)acrylic acid, or by unsaturated carboxylic acid anhydrides, such as maleic anhydride.

Mention may also be made of:

copolymers of ethylene, of an unsaturated epoxy and, optionally, of an unsaturated carboxylic acid ester or salt or of a vinyl ester of a saturated carboxylic acid. These are, for example, ethylene/vinyl acetate/glycidyl (meth)acrylate copolymers or ethylene/alkyl (meth) acrylate/glycidyl (meth)acrylate copolymers;

copolymers of ethylene, of an unsaturated carboxylic acid anhydride and/or of an unsaturated carboxylic acid, possibly partly neutralized by a metal (Zn) or an alkali metal (Li), and optionally of an unsaturated carboxylic acid ester or of a vinyl ester of a saturated carboxylic acid. These are, for example, ethylene/vinyl acetate/ maleic anhydride copolymers or ethylene/alkyl (meth) acrylate/maleic anhydride copolymers or ethylene/Zn or Li (meth)acrylate/maleic anhydride copolymers; and polyethylene, polypropylene, ethylene-propylene copolymers which are grafted or copolymerized with an unsaturated carboxylic acid anhydride and then condensed with a mono-aminated polyamide (or a polyamide oligomer. These products are described in EP 342,066.

Advantageously, the functionalized polyolefin is selected from ethylene/alkyl (meth)acrylate/maleic anhydride copolymers, ethylene/vinyl acetate/maleic anhydride copolymers, ethylene-propylene copolymers which contain mostly propylene, these being grafted by maleic anhydride and then condensed with monoaminated nylon-6 or monoaminated oligomers of caprolactam.

Preferably, this is an ethylene/alkyl (meth)acrylate/maleic anhydride copolymer containing up to 40% by weight of alkyl (meth)acrylate and up to 10% by weight of maleic anhydride.

The alkyl (meth)acrylate may be selected from methyl acrylate, ethyl acrylate, n-butyl acrylate, isobutyl acrylate, 2-ethylhexyl acrylate, cyclohexyl acrylate, methyl methacrylate and ethyl methacrylate.

By way of grafted aliphatic polyesters, mention may be made of polycaprolactone grafted by maleic anhydride, glycidyl methacrylate, vinyl esters or styrene. These products are described in Application EP 711,791, the contents of which are incorporated in the present application.

The polyamide-block polyether-block polymers were described earlier with regard to the polymers (M). These products may be grafted by vinyl chloride or alkyl acrylates. These products are described in Patent EP 365,398, the contents of which are incorporated in the present application.

The polymers (M), (K) and (S) may contain plasticizers, fillers, fire retardants, glass fibres, etc.

The invention is particularly useful in the case of thermoplastics (M) such as polyamides and saturated polyesters.

Advantageously, (M) and (K) are selected from the same family of polymers and (S) is selected from ethylene/alkyl (meth)acrylate/maleic anhydride copolymers, ethylene/ vinyl acetate/maleic anhydride copolymers, ethylene/alkyl (meth)acrylate/glycidyl (meth)acrylate copolymers and ethylene/vinyl acetate/glycidyl (meth)acrylate copolymers.

Preferably, (M) and (K) are chosen to be very similar to each other in the same family of polymers, for example PA-11 and PA-12.

According to the preferred embodiments of the invention, polymers having the following properties or characteristics are respectively chosen for (M), (S) and (K):

rigid/flexible/rigid high $T_g$/low $T_g$/high $T_g$ $T_g>0°$ C./$T_g<0°$ C./$T_g>0°$ C. ($T_g$ denotes the glass transition temperature)

semi-crystalline/amorphous or pseudo-amorphous/semi-crystalline crystalline/amorphous or pseudo-amorphous/crystalline.

EXAMPLES

The following designations are used:

PA-11: a nylon-11 having a $M_w$ of between 45,000 and 55,000 and not containing a plasticizer;

PA-11 P.20: a nylon-11 of the PA-11 type containing (7±2)% by weight of BBSA (butylbenzene sulphonamide) as plasticizer;

PA-11 p.40: a nylon-11 of the PA-11 type containing (12±2)% by weight of BBSA.

PA-12: a nylon-12 of $M_w$ of from 45,000 to 55,000.

L: an ethylene/butyl acrylate/maleic anhydride copolymer having as proportions by weight 79/18/3 and an MFI of 3 to 6, which is a random copolymer obtained by high-pressure radical catalysis.

MFI denotes the melt flow index.

LOTRYL: an ethylene/methyl acrylate copolymer having as proportions by weight 84/16 and an MFI of 0.3 at 190° C., 2.16 kg.

PA-12 p.20: a nylon-12 containing (7±2)% by weight of BBSA.

PA-12 p.40: a nylon-12 containing (12±2)% by weight of BBSA.

$EPR_m$ denotes a maleicized EPR (ethylene propylene copolymer).

The results are given in the following table (the % are by weight). The compositions indicated in the table correspond to a total of 100%, the percentage of the major component not appearing. For example: PA-11 p.20+6% L+6% PA-12 means that there is 88% of PA-11 p.20 in the composition.

In Example 20 (PA-11+5% PASA) means a nylon-li containing 95% of PA-11 and 5% of PASA.

PASA denotes a semi-aromatic polyamide obtained by the condensation of lauryllactam, BMACM [bis-(3-methyl-4-aminocyclohexyl)methane], isophthalic acid and terephthalic acid, as described in EP 550,308.

In the table, the "expected flexural modulus" denotes the flexural modulus calculated from the percentages of the constituents without taking account of any synergy between the constituents or of the morphology. Thus, in Example 5, a value of 600 MPa is expected because there is the same amount of PA and because 600 MPa was measured for Example 3 (the difference in modulus of PA-11 and PA-12 has been neglected).

TABLE 1

| Ex. No. | Comparative | Composition | Flexural modulus ISO 178 MPa | Expected flex. mod. | Pipe burst (stress) at +23°C NFR 12632 MPa | Burst modulus °×100 | Tension: stress at 50% elongation ISO R 527 MPa | Notched Charpy impact -40°C (new standard) ISO 179:93 kJ/m² | Transmission good if high (560 nm, 2 mm) % | Opacity good if low % | Viscosity MFI 235°C, 5 kg g/10 mn | Manufacture (possible even on a short, low-mixing extruder) | Exudation (loss of plasticizer when hot) % | Morphology Nodule diameter $D_v$ (SEM) μm | Encapsulation Is K encapsulated? |
|---|---|---|---|---|---|---|---|---|---|---|---|---|---|---|---|
| | | | | | | Unplasticized PA-11 family | | | | | | | | | |
| 1 | x | PA12 | 1100 | | | | | | 10 | 35 | | | | | |
| 2 | x | PA11 | 1000 | | | | | | 33 | 36 | | | | | |
| 3 | x | PA11 + 25% L | 600 | | | | | | 23 | 46 | | | | | |
| 4 | x | PA11 + 50% L | 320 | | 18 | 6 | | | 15 | 60 | | | | | |
| 5 | x | PA11 + 25% L + 25% PA12 | 450 | 600 | 31 | 7 | | | 27 | 43 | | | | | yes |
| 29 | x | PA11 + 10% L | 860 | | | | | 14 | 14 | 52 | | | | | |
| | | | | | Superflexible (150–200 MPa) plasticized PA-11 family | | | | | | | | | | |
| 6 | | PA11p40 | 300 | | 24 | 8 | 15 | 6 | 19 | 40 | | | | | |
| 7 | | PA11f15 | 160 | | 14 | 8 | 16.5 | 2 | 28 | 43 | | | | | |
| 8' | x | PA11p40 + 25% L + 5% Lotryl | 180 | | 15 | 8 | 16.5 | 7 | 13 | 58 | | yes | -31% | 0.2 | |
| 8 | x | PA11p40 + 30% L | 180 | | 15 | 8 | 16.5 | 7 | 14 | 57 | | no | -9% | 0.3 | |
| 9 | | PA11p40 + 15% L + 15% PA12 | 185 | 255 | 20 | 11 | 23 | 9 | 20 | 48 | | no | -9% | 0.2 | yes |
| | | | | | Flexible (300–350 MPa) plasticized PA-11 family | | | | | | | | | | |
| 10 | | PA11p20 | 420 | | 32 | 8 | 24.5 | 10 | 25 | 40 | | yes | | 0.2 | |
| 6 | | PA11p40 | 300 | | 24 | 8 | 24.5 | 6 | 19 | 40 | | | | | |
| 11 | x | PA11p40 + 12% L | 320 | 430 | 24 | 8 | 24.5 | 8 | 16 | 54 | | yes | -13% | 0.2 | yes |
| 12 | x | PA11P20 + 6% L + 6% PA12 | 340 | | 29 | 9 | 31 | 17 | 21 | 47 | | yes | -6% | 0.07 | yes |
| | | | | | | | | | Various | | | | | | |
| 13 | | PA12p40 | 400 | | 25 | | | 4 | 10 | 47 | 10 | | | | |
| 14 | x | PA12p40 + 30% L | 195 | | | | | 5 | 17 | 40 | 0.3 | no | -9% | 0.2 | yes |
| 15 | x | PA12p40 + 15% L + 15% PA12 | 225 | 325 | 21 | 9 | | | 1 | 63 | 3 | yes | -9% | 0.07 | no |
| 16 | | PA12p40 + 5% mEPR + 7% PA12 | 360 | | 28 | 8 | | | 22 | 47 | | | -6% | 0.8 | yes |
| 12' | | PA11p20 + 5% L + 7% PA12 | 355 | 450 | 29 | 8 | | | 20 | 48 | | yes | -6% | 0.07 | yes |
| 17 | | PA11p40 + 10% L + 20% PA12 | 215 | | 22 | 10 | | 9 | 9 | 56 | | | -9% | 0.07 | yes |
| 18 | x | PA11p40 + 10% L + 20% HDPE | 310 | | 22 | 7 | | 8 | 16 | 53 | | | -9% | 0.9 | yes |
| 19 | | PA11p20 + 5% L + 7% PA6 | 380 | | 29 | 8 | | 8 | 21 | 40 | | | -6% | 0.6 | yes |
| 20 | | (PA11 + 5% PASA) + 6% L + 6% PA12 | 1000 | | | | | | | | | | | 0.07 | yes |

TABLE 1-continued

|  |  |  | Mechanical properties | | | | | Notched | Optical properties | | | | | Morphology | Encapsulation |
|---|---|---|---|---|---|---|---|---|---|---|---|---|---|---|---|
| | | | | | | | | | Transparency | | | | | | |
| Ex. No. | Comparative | Composition | Flexural modulus ISO 178 MPa | Expected flex. mod. | Pipe burst (stress) at +23°C NFR 12632 MPa | Burst modulus °100 | Tension: stress at 50% elongation ISO R 527 MPa | Charpy impact −40°C (new standard) ISO 179:93 kJ/m² | good if high Transmission (560 nm, 2 mm) % | good if low Opacity % | Viscosity MFI 235°C, 5 kg g/10 mn | Manufacture (possible even on a short, low-mixing extruder) | Exudation (loss of plasticizer when hot) % | Nodule diameter D$_v$ (SEM) μm | Is K encapsulated? |
| | | | | | Unplasticized PA-12 family | | | | | | | | | | |
| 28 | x | PA12 | 1100 | | | | | | | | 30 | | | | |
| 25 | x | PA12 + 15% L | 880 | | | | | | | | 9 | | | | |
| 26 | x | PA12 + 30% L | 715 | | 27.5 | 3.8 | | 9.5 | mod. good | mod. | 4 | no | | 0.25 | |
| 27 | x | PA12 + 15% L + 15% PA11 | 740 | 860 | 30.5 | 4.1 | | 10 | good | good | 14 | yes | | 0.15 | |

What is claimed is:

1. A thermoplastic composition comprising nodules dispersed in a matrix, wherein the matrix comprises a polymer M;

the nodules comprises nodules of a polymer K, nodules of the polymer K entirely or partly encapsulated in a polymer S, and nodules of the polymer S, and the tensile strength and transparency of the composition is greater than those of a composition comprising only polymers M and S while the proportion by weight of the polymer M being the same, and the nodules of the polymer K encapsulated in the polymer S are smaller in diameter than the nodules of the polymer S alone.

2. The composition according to claim 1, wherein the polymer M is selected from the group consisting of polyolefins, polyamides, fluoropolymers, saturated polyesters, polycarbonate, styrene resins, PMMA, polyurethanes (TPU), copolymers having polyamide blocks, copolymers having polyester blocks and polyether blocks, PVC, ethylene-vinyl alcohol copolymers, and polyketones.

3. The composition according to claim 1, wherein the polymer K is selected from the same polymers as the polymer M.

4. The composition according to claim 1, wherein the polymer S is selected from the group consisting of functionalized polyolefins, grafted aliphatic polyesters and polyamide-block polyether-block polymers.

5. The composition according to claim 1, wherein the polymer M is PA-11, the polymer S is an ethylene/alkyl (meth)acrylate/maleic anhydride copolymer and the polymer K is PA-12.

6. The composition according to claim 2, wherein the polymer K is selected from the same polymers as the polymer M.

7. The composition according to claim 2, wherein the polymer S is selected from the group consisting of functionalized polyolefins, grafted aliphatic polyesters and polyamide-block polyether-block polymers.

8. The composition according to claim 3, wherein the polymer S is selected from the group consisting of functionalized polyolefins, grafted aliphatic polyesters and polyamide-block polyether-block polymers.

9. The composition according to claim 4, wherein the polymer S is grafted.

10. The composition according to claim 7, wherein the polymer S is grafted.

11. The composition according to claim 8, wherein the polymer S is grafted.

12. The composition according to claim 2, wherein the polymer M is PA-11, the polymer S is an ethylene/alkyl (meth)acrylate/maleic anhydride copolymer and the polymer K is PA-12.

13. The composition according to claim 3, wherein the polymer M is PA-11, the polymer S is an ethylene/alkyl (meth)acrylate/maleic anhydride copolymer and the polymer K is PA-12.

14. The composition according to claim 4, wherein the polymer M is PA-11, the polymer S is an ethylene/alkyl (meth)acrylate/maleic anhydride copolymer and the polymer K is PA-12.

15. The composition according to claim 9, wherein the polymer M is PA-11, the polymer S is an ethylene/alkyl (meth)acrylate/maleic anhydride copolymer and the polymer K is PA-12.

16. A thermoplastic composition comprising nodules dispersed in a matrix, wherein the matrix comprises a polymer M;

the nodules comprises nodules of a polymer K, nodules of the polymer K entirely or partly encapsulated in a polymer S, and nodules of the polymer S, the nodules of the polymer K encapsulated in the polymer S being less than 0.5 $\mu$m, and the tensile strength of the composition is greater than that of a composition comprising only polymers M and S while the proportion by weight of the polymer M being the same, and the nodules of the polymer K encapsulated in the polymer S are smaller in diameter than the nodules of the polymer S alone.

17. A thermoplastic composition comprising nodules dispersed in a matrix, wherein the matrix comprises a polymer M;

the nodules comprises nodules of a polymer K, nodules of the polymer K entirely or partly encapsulated in a polymer S, and nodules of the polymer S, and the compatibility of the polymers K and S are equal to or higher than the compatibility of the polymers S and M, and the tensile strength of the composition is greater than that of a composition comprising only polymers M and S while the proportion by weight of the polymer M being the same, and the nodules of the polymer K encapsulated in the polymer S are smaller in diameter than the nodules of the polymer S alone.

18. The composition according to claim 17, wherein size of the nodules of the polymer S is less than 0.5 $\mu$m.

19. The composition according to claim 17, wherein size of the nodules of the polymer S is or less than 0.2 $\mu$m.

* * * * *